United States Patent [19]
Clayton et al.

[11] Patent Number: 5,120,976
[45] Date of Patent: Jun. 9, 1992

[54] STRIP LAY-UP VERIFICATION SYSTEM WITH WIDTH AND CENTERLINE SKEW DETERMINATION

[75] Inventors: Daniel A. Clayton, Bellevue; Gregory M. Garriss, Federal Way; Joe R. Long, Auburn, all of Wash.

[73] Assignee: The Boeing Company, Seattle, Wash.

[21] Appl. No.: 558,057

[22] Filed: Jul. 25, 1990

[51] Int. Cl.⁵ .......................................... G01N 21/86
[52] U.S. Cl. .................................. 250/560; 250/561
[58] Field of Search .................. 250/560, 561, 571; 356/429, 385

[56] References Cited

U.S. PATENT DOCUMENTS

| | | | |
|---|---|---|---|
| 2,791,931 | 5/1957 | Summerhayes, Jr. | 88/14 |
| 3,746,451 | 7/1973 | Croissant et al. | 356/159 |
| 3,796,492 | 3/1974 | Cullen et al. | 356/4 |
| 3,890,509 | 6/1975 | Maxey | 250/561 |
| 4,033,697 | 7/1977 | Pfoutz et al. | 356/160 |
| 4,223,346 | 9/1980 | Neiheisel et al. | 358/106 |
| 4,240,110 | 12/1980 | Henry | 358/107 |
| 4,319,270 | 3/1982 | Kimura et al. | 358/106 |
| 4,367,487 | 1/1983 | Klein et al. | 358/107 |
| 4,384,303 | 5/1983 | Brenke et al. | 358/107 |
| 4,499,383 | 2/1985 | Loose | 250/561 |
| 4,528,630 | 7/1985 | Sargent | 250/561 |
| 4,641,070 | 2/1987 | Pfizenmaier et al. | 250/561 |
| 4,641,357 | 2/1987 | Satoh | 250/561 |
| 4,658,144 | 4/1987 | Croyle | 250/561 |
| 4,675,730 | 6/1987 | Adomaitis et al. | 358/106 |
| 4,677,473 | 6/1987 | Okamoto et al. | 358/101 |
| 4,731,649 | 3/1988 | Chang et al. | 358/106 |
| 4,750,835 | 6/1988 | McMurtry | 356/375 |
| 4,870,291 | 9/1989 | Hayashi et al. | 356/429 |

*Primary Examiner*—David C. Nelms
*Attorney, Agent, or Firm*—Christensen, O'Connor, Johnson & Kindness

[57] ABSTRACT

A method and apparatus for monitoring characteristics of strips that are laid on a surface are disclosed. The method determines gaps and overlaps between adjacent strips on a surface by determining and analyzing the centerline skew and/or width of the strips near a common point of the surface. The method can be carried out during the strip lay-up process. The apparatus includes a sensor component and a controller. The sensor is positionable in close proximity to the point at which a strip is laid on a surface. Further, the sensor can be positioned on one side of the surface. The controller is in signal communication with said sensor component. The controller includes means for causing the sensor component to gather and transmit edge image signals. The controller receives the edge image signals and determines characteristics of the strip, such as centerline skew and width, as the strip appears on the surface. The characteristic information is analyzed to identify gaps or overlaps between adjacent strips.

21 Claims, 7 Drawing Sheets

STRIP LAY-UP VERIFICATION SYSTEM WITH WIDTH AND CENTERLINE SKEW DETERMINATION

TECHNICAL FIELD OF THE INVENTION

The present invention relates to systems for laying material strips and, more particularly, to automated systems for verifying strip characteristics such as centerline skew and width during a lay-up process and analyzing the characteristics to obtain gap/overlap information for adjacent strips.

BACKGROUND OF THE INVENTION

Composite tape strips are used in the aerospace and other industries to form composite parts. The demand for composite parts is increasing as new uses for such parts are explored. As the demand for composite parts has increased, it has become more desirable to efficiently automate composite part manufacturing methods. Because composite parts are often used in safety critical environments, such as in the manufacture of airplanes, the parts must be of a high and verifiable quality. The quality of composite parts depends in large part on the accuracy of the tape lay-up process and the quality of the material used.

A tape lay-up machine for forming composite parts generally includes a tape feed mechanism from which rolled tape is dispensed, a guide shoe for guiding the tape onto a receiving surface, and a pressure foot for smoothing the tape against the receiving surface. The tape lay-up machine also includes a control system. The tape is laid according to a preprogrammed numerical control (NC) path plan, which is executed by the control system. The tape lay-up machine moves in three dimensions in relation to the part that is being formed; the lay-up machine also has a warp axis for laying of contoured shapes. The tape strips are laid side-by-side, one strip at a time to form a layer, and one layer at a time. Generally, the NC path plan is nonadaptive; the path plan is not modified during the lay-up process in response to inconsistencies in the tape width and/or tape skew. If a layer does not meet the requisite quality requirements, the layer is removed and a portion of the NC path plan is rerun in order to re-lay the layer.

One major quality control focus in tape lay-up processes is on the minimization of gaps and overlaps (negative gaps) between adjacent tape strips in each ply. The existence of gaps/overlaps between the tape strips affects the integrity of the composite part. Gaps and overlaps between strips may be caused by the skewing of one or both of the tape strips from their expected centered position and/or by variations in the tape width. Skewing of the tape may result from a poorly rolled tape source or from the lay-up process itself. Quality control during a tape lay-up process normally includes visual inspection of each layer for gaps/overlaps. If the gaps and overlaps in a layer are out of tolerance, the tape strips are removed and new strips are laid. This type of quality control may provide an acceptable final product, but it does not provide accurate information regarding the cause of the gaps and overlaps. Thus, it is difficult to determine whether problems are caused by poor tape quality (e.g., width or roll-up inconsistencies) or by the operation of the tape lay-up machine. Such a quality control procedure is also one reason why tape lay-up processes are very labor intensive.

In order to accurately monitor the gap/overlap occurring during the tape lay-up process and to provide useful information about the quality of each layer, the width of the tape and the tape's centerline skew are monitored. If the tape width is greater or less than expected, overlaps and gaps, respectively, may result. If the centerline of the tape, as it is laid, is skewed from the expected centerline, an overlap may occur at one edge of the tape and a gap at the other edge. A combination of tape width inconsistencies and centerline skew can create significant gaps and overlaps between adjacent tape strips.

Many systems exist for monitoring the width of strips. For example, when steel, glass and tape strips are produced, the quality of the strips will depend in part on the consistency of the strip's width. Width monitoring systems are often integrated into these types of strip manufacturing systems. In certain width monitoring systems, the positions of both edges of the strip are monitored in order to calculate the width of the strip. In other width monitoring systems, the position of one edge of the strip is monitored; the second edge is aligned against a fixed barrier. In these strip manufacturing systems, the relative position of the material strip on a receiving surface is not considered. Contrariwise, the systems are generally designed to monitor the strip width while limiting the effects of strip skewing on the monitoring process.

An example of a strip width monitoring system is the luminous object monitoring system disclosed in U.S. Pat. No. 4,033,697 (Pfoutz et al.). The system monitors the width of a hot strip of material during manufacture by using two sensing devices placed above the strip and spaced apart a distance to permit viewing of each edge of the strip. The sensing devices each include an array of light-sensitive detectors. The strip edges are imaged onto the detectors using visible and infrared radiation from the hot strips. Edge position information is determined for each edge. The edge position information is combined with the fixed dimension between the two sensing devices. The result represents the total strip width. The strip width information is provided to an operator for manufacturing control purposes. The strip width information is generally relatively inexact and is not used for analysis of strip position.

Prior systems also exist for monitoring the centerline of a strip of material. An example of such a system is a system for controlling the rolling of tape onto a spool. Many centerline monitoring systems use edge detection techniques similar to those described in the Pfoutz et al. patent. Such systems generally test the tape edge positions to determine whether the edges are symmetrically positioned about a desired centerline. Such systems do not provide centerline data or centerline data analysis. These systems are used in applications wherein the centering of the tape is important but the relative position of the tape on a receiving surface is not of consequence. In such applications, the tape width is also not of consequence.

One drawback of prior strip width detecting and strip centering systems is that the systems are relatively large. For example, many prior systems include backlighted areas requiring one or more illuminating components arranged below the surface over which the strips travel. The remainder of the monitoring system is arranged above the surface. Such systems cannot be incorporated into a tape lay-up machine near the pressure foot because of size constraints. Another drawback of prior systems is that they do not generally provide accurate strip width and centerline skew information that can be analyzed to provide a measurement of gaps and overlaps between adjacent strips on a receiving surface. The present invention provides solutions to these and other problems in the prior art.

SUMMARY OF THE INVENTION

In accordance with the present invention, an apparatus and method for monitoring a strip of material during a strip lay-up process in order to determine characteristics of the strip on the receiving surface is provided. The characteristics may be strip centerline skew and/or strip width. The present invention also analyzes the gap/overlap between adjacent strips using the strip characteristic information.

The system monitors a strip having a particular reflective characteristic as it is laid on a receiving surface. The system includes a contrasting surface, a sensor component and a controller. The contrasting surface has a reflective characteristic that contrasts the reflective characteristic of the strip. The strip is guided between the contrasting surface and the sensor component as the strip is laid. The sensor component includes an illuminating device for illuminating an area including each edge of the strip, and an imaging device for detecting the light reflected by the illuminated area and generating edge image signals from the detected light. The controller is in signal communication with the sensor component. The controller causes the sensor component to illuminate the area and generate the edge image signals. The controller then receives the edge image signals and determines the strip characteristics from the signals. The system is positionable close to the point at which the strip is laid; the image signals include strip information that corresponds to the strip characteristics on the receiving surface.

In accordance with certain aspects of the present invention, the strip characteristics are centerline skew and strip width. One or more of the characteristics can be determined.

In accordance with further aspects of the present invention, the controller determines gap and overlap information for adjacent strips. As the strips are laid side-by-side, strip characteristic information is generated for each strip. Additionally, strip segment information is generated. The strip segment information identifies longitudinal points in the strip laying process so that common points shared by adjacent strips can be identified. The gap and overlap information is generated by comparing the strip characteristic information for common points of adjacent strips.

In accordance with other aspects of the present invention, the illuminating device includes a pair of light-emitting diode array, and the imaging device includes a gradient refractive index lens array and an array of charge coupled devices.

In accordance with still other aspects of the present invention, the sensor component includes a pair of edge detectors; each edge detector includes an illuminating device and an imaging device. Each edge detector illuminates a subarea. Each subarea includes a strip edge.

The sensor component of the present invention generates an edge image signal in a strip lay-up system wherein the strip has particular reflective characteristics and the strip lay-up system includes a surface that contrasts the reflective characteristic of the strip. The sensor component includes an illuminating device and an imaging device. The illuminating device illuminates an area including each strip edge as the strip is guided over the contrasting surface. The imaging device detects the light reflected by the illuminated area and generates edge image signals. The sensor component is positionable such that the strip passes between the sensor component and the contrasting surface as the strip is laid.

The method of the present invention gathers and analyzes strip characteristic information for adjacent strips, and generates signals indicative of the gap or overlap between the strips. In accordance with the method, an area is illuminated that includes each edge of the strips as the strips are being laid. The light reflected by the illuminated area is detected as the strips are laid at a common point on the receiving surface. Edge image signals are generated for each of the strips based on the light reflected by the illuminated area. A strip characteristic value is determined for each of the strips based on the edge image signals. Finally, the strip characteristic values for the common points are compared and signals indicative of the gap or overlap between the strips are generated.

In accordance with other aspects of the present invention, the strip characteristic is centerline skew and/or tape width.

In accordance with still further aspects of the present invention, the step of illuminating an area includes illuminating two subareas, each of the subareas including one edge of each of the strips.

BRIEF DESCRIPTION OF THE DRAWINGS

The foregoing and other features and advantages of this invention will become more readily appreciated and the same become better understood by reference to the following detailed description of preferred embodiments of the invention, when taken in conjunction with the accompanying drawings, wherein.

DETAILED DESCRIPTION OF THE PREFERRED EMBODIMENTS

The present invention is described herein in conjunction with the operation of a composite tape lay-up system for manufacturing composite parts. It is to be understood that this description is not meant to be limiting but rather describes only one of the applications of the method and apparatus of the present invention.

Figure 1:
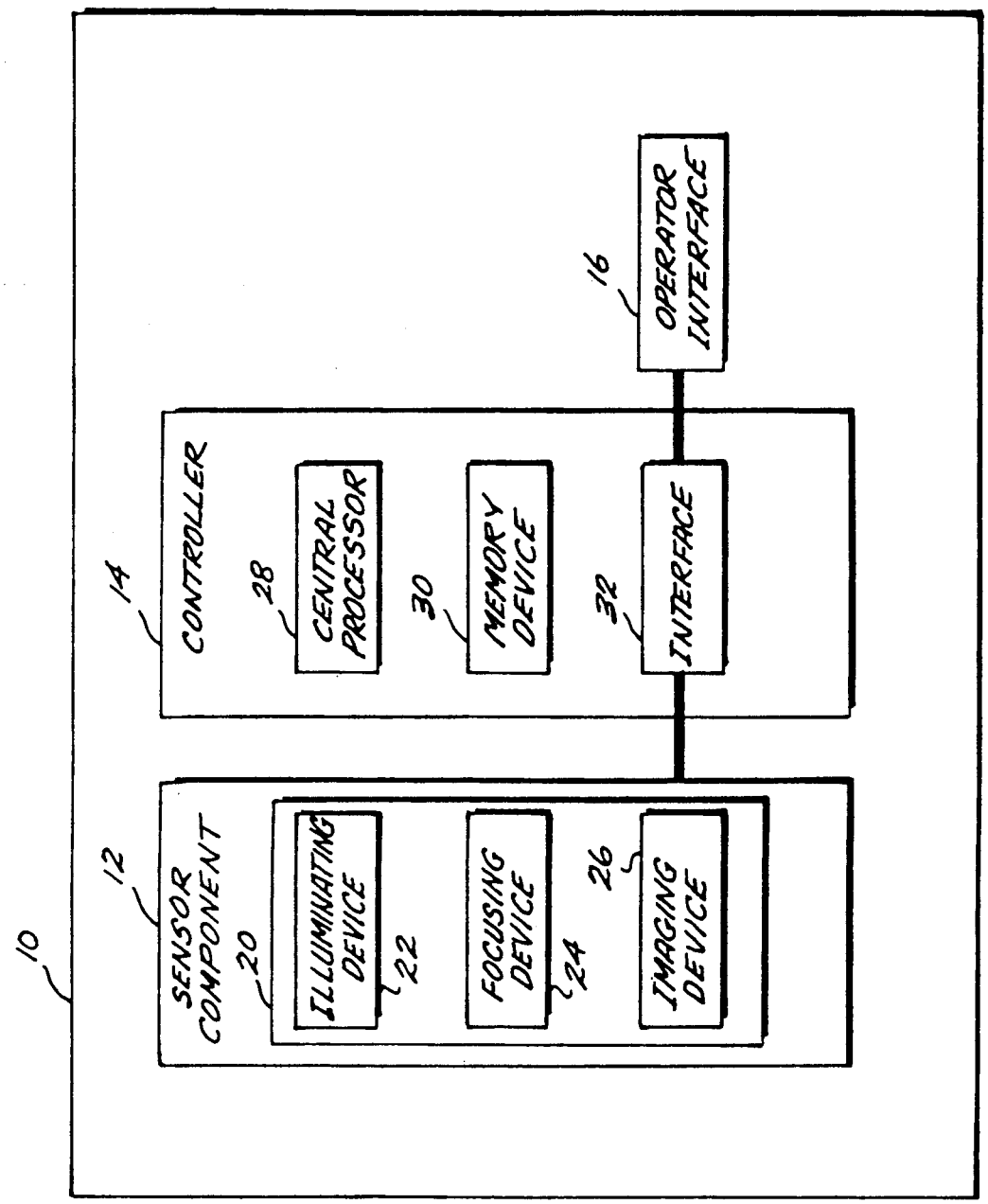
FIG. 1 is a block diagram of a strip lay-up verification system formed in accordance with the present invention.

FIG. 1 illustrates in functional block form a strip lay-up verification system 10 formed in accordance with this invention. The illustrated strip lay-up verification system 10 includes a sensor component 12 connected to a controller 14. Optional operator interface 16 is also connected to the controller. The intercomponent connections provide electronic communication between the components. As described more fully below, data related to a strip is gathered by the sensor component 12 as the strip is laid. The data is then analyzed to provide strip centerline skew, strip width, and gap/overlap information. More specifically, in operation, the sensor component 12 is controlled by the controller 14 so as to generate two sets of edge image signals, one set for each tape edge. The controller receives the edge image signals from the sensor component and converts the signals into data in a useful format. In a monitoring system that performs ongoing analysis, once at least two adjacent strips are laid, the controller 14 performs a strip lay-up verification analysis. The controller stores the result of the analysis and/or displays it via the operator interface. The system provides immediate tape lay-up information that can be used to modify the lay-up process in order to ensure that the final product satisfies predetermined quality criteria.

The sensor component 12 includes two identical edge detectors 20, only one of which is shown in FIG. 1. Each edge detector includes an illuminating device 22, a focusing device 24, and an imaging device 26. The controller 14 includes a central processor 28, a memory device 30 and an interface 32. A main control program and data are stored in the memory device 30. The interface 32 is the input/output component of the controller. Controller information that is passed to and from the sensor component 12 and the operator interface 16 is passed via the interface 32.

In one actual embodiment, the sensor component 12 and controller 14 are constructed as a single unit. Such a system is extremely compact and can be positioned near the pressure foot of a tape lay-up machine. The unit is small enough that it can be positioned within three or four inches of the pressure foot. From this vantage point, the positions of the tape edges are monitored at essentially the point at which the tape is laid on the receiving surface. Thus, data that accurately reflects the tape's characteristics on the receiving surface is gathered.

The operator interface 16 may be a personal computer, a printer, or some other form of input and/or output device. If the operator interface is a personal computer, the operator inputs information via the computer keyboard and the resulting data is displayed on the computer monitor.

Figure 2:
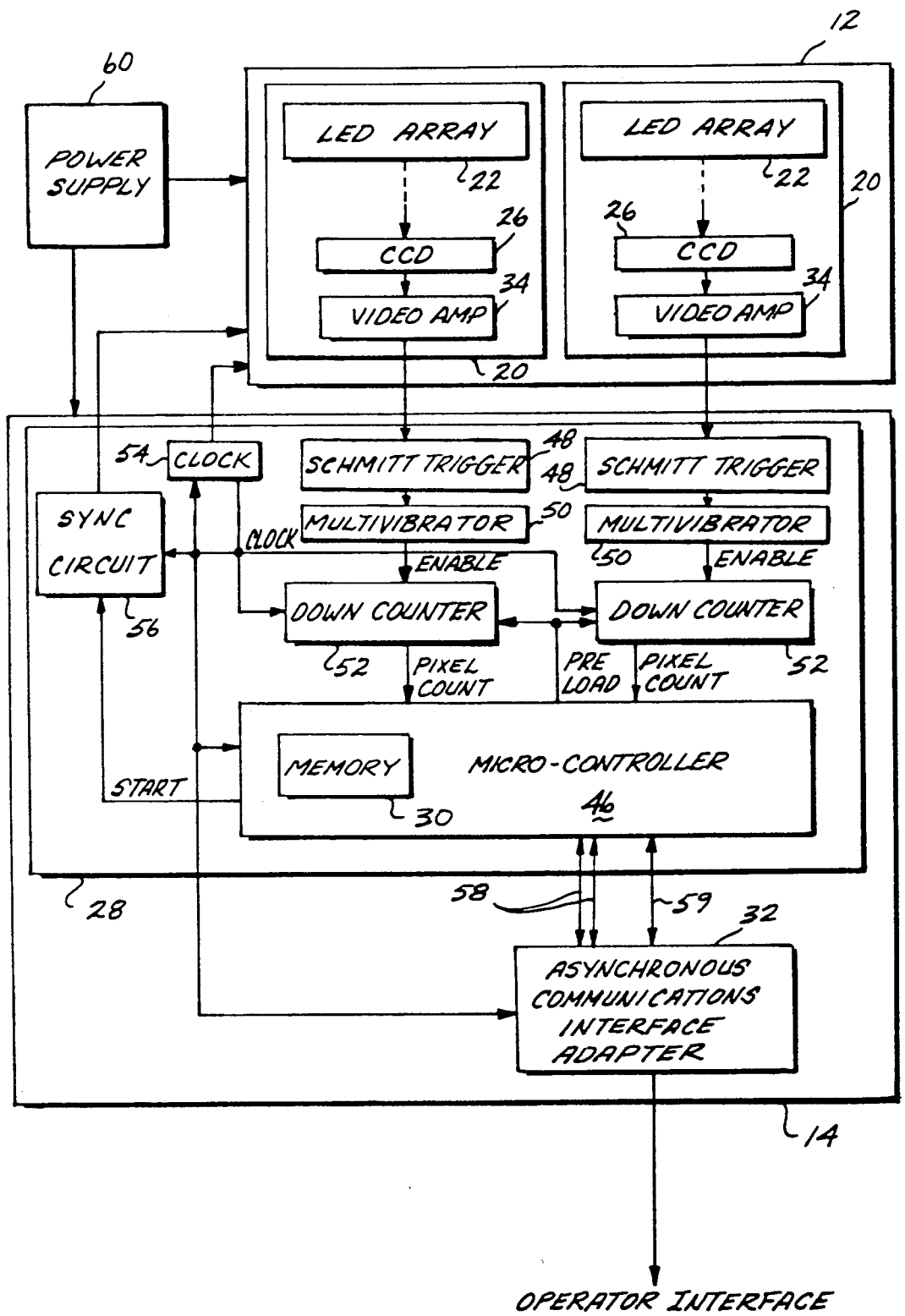
FIG. 2 is a detailed diagram of the electronic components of a strip lay-up verification system formed in accordance with the present invention.

As shown in FIG. 2, the sensor component 12 includes electronic illuminating devices and imaging devices. The illuminating devices 26 of the edge detectors 20 are formed by light-emitting diode (LED) arrays and the imaging devices 26 are formed by charge coupled devices (CCDs). Preferably, the outputs of the CCDs are amplified by video amplifiers 34. The video amplifiers boost the CCD signals to a usable level before they are supplied to the controller 14.

Figure 3:
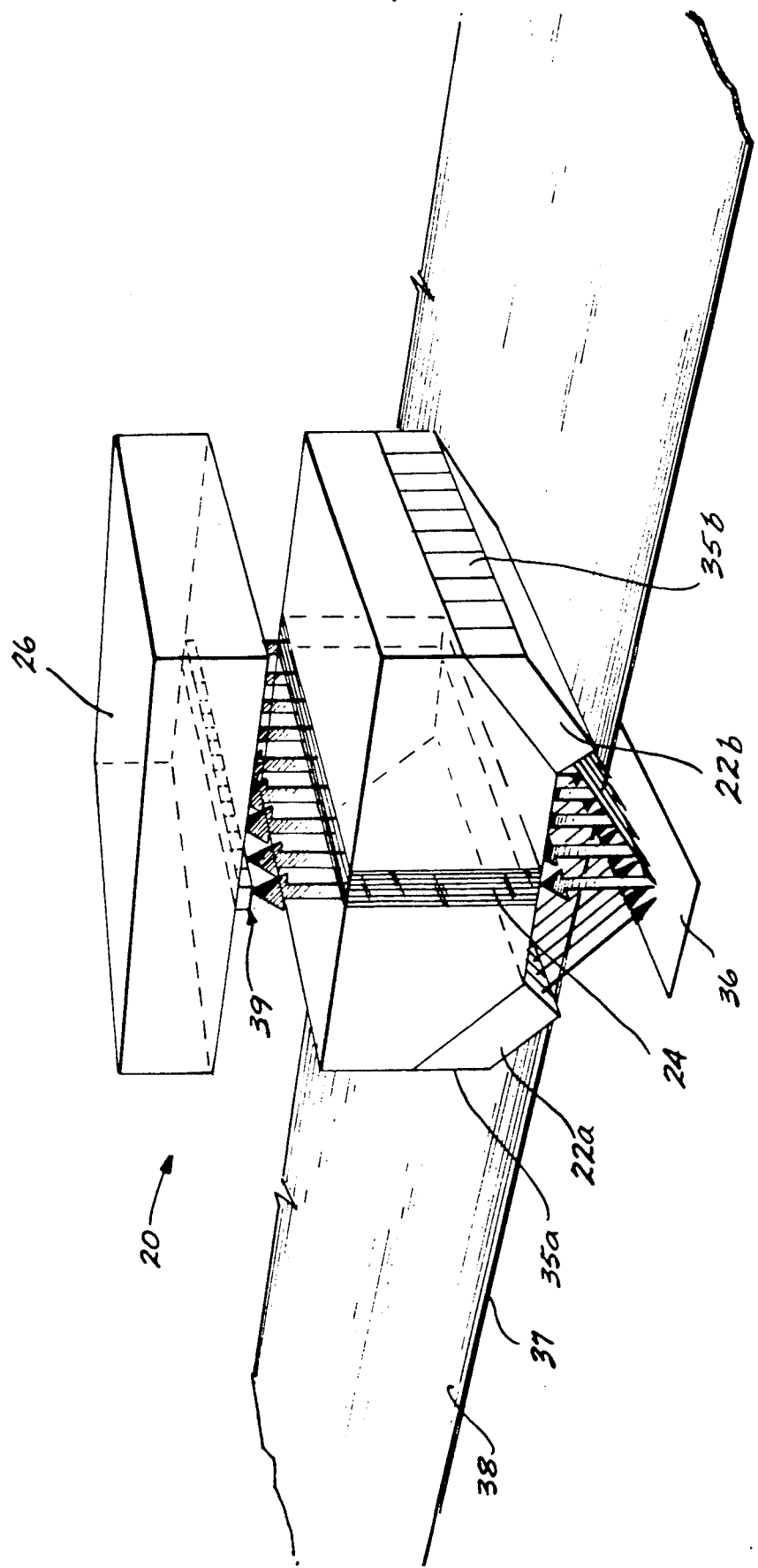
FIG. 3 is a schematic diagram of an edge detector suitable for use in the sensor component of a strip lay-up verification system formed in accordance with the present invention.

FIG. 3 illustrates a single edge detector 20 positioned above a tape 38. Each illuminating device 22 includes two sections 22a and 22b each containing a linear array of ten high-intensity LEDs 35a and 35b. One benefit of using LED arrays is that they are relatively insensitive to changes in temperature in comparison to other illuminating devices. Thus, unstable temperatures around the sensor component will not cause a light output variation that affects the sensor component's ability to detect the edge of a tape. The two sections 22a and 22b are positioned on opposite sides of the edge detector 20 so that light is emitted from the arrays toward one another in planes that intersect at a contrasting surface 36. Preferably, each plane of light forms a 45° angle with respect to the contrasting surface 36. The light emitted by the arrays is diffused by an optical diffuser (not shown) so as to provide an evenly illuminated elongate, rectangular area at the point where the planes of light intersect the contrasting surface 36. This arrangement provides the monochromatic, extremely intense light needed to illuminate one edge 37 of the tape 38. The LED arrays are oriented such that the longitudinal axis of the illuminated rectangular area lies orthogonal to the edge 37 of the tape 38.

The preferred focusing device 24 is an array of gradient refractive index lenses. A gradient refractive index lens array is a fiber-optic device having known focusing characteristics. Each fiber-optic element of the bundle forms a lens that acts in a linear fashion. As shown in FIG. 3, the gradient refractive index lens array is located between the two illuminating device sections 22a and 22b and oriented such that the optical axis of the lenses lie orthogonal to the plane of the contrasting surface 36 and the tape 38. As a result, the gradient refractive index lens array is focused on the illuminated rectangular area created by the two illuminating device sections 22a and 22b. The light reflected from the rectangular area is focused upon the CCDs 39 of the imaging device 26. The CCD array forms a line that corresponds to the elongate, rectangular area illuminated by the two illuminating device sections 22a and 22b.

One suitable imaging device is a reticon RL512K camera manufactured by EG&G Reticon of Sunnyvale, Calif. The focusing device 24 focuses the rectangular area of light in a plane that lies perpendicular to the tape edge onto the CCDs. As will be better understood from the following description, the CCD array 39 is sequentially scanned. As the CCDs are scanned, each produces an output which is proportional to the amount of charge created by the impinging light. The difference in reflectivity between the tape 38 and the contrasting surface 36 determines which CCDs produce a high-analog output and which produce a low-analog output.

In one actual embodiment, the centerline verification system is positioned in a tape lay-up machine so that it monitors the tape within inches of the pressure foot, e.g., the point at which the tape is laid onto a receiving surface. The machine is designed so that the tape runs over a bright, highly contrasting surface 36 on the tape guide shoe just prior to being laid on the receiving surface (not shown). More specifically, after leaving a tape roller, the tape is threaded between the guide shoe contrasting surface 36 and the sensor component 12. Because of the close proximity of the contrasting surface 36 to the receiving surface, the centerline skew and tape width monitored at the contrasting surface 36 accurately reflects the centerline skew and tape width characteristics of the tape on the receiving surface.

Because contrasting surface 36 is bright and highly reflective, a high contrast exists between the surface and the tape, which is dull and nonreflective. If the chosen tape were highly reflective, the material chosen to form the contrasting surface 36 would have been nonreflective in order to contrast with the tape.

Figure 4:
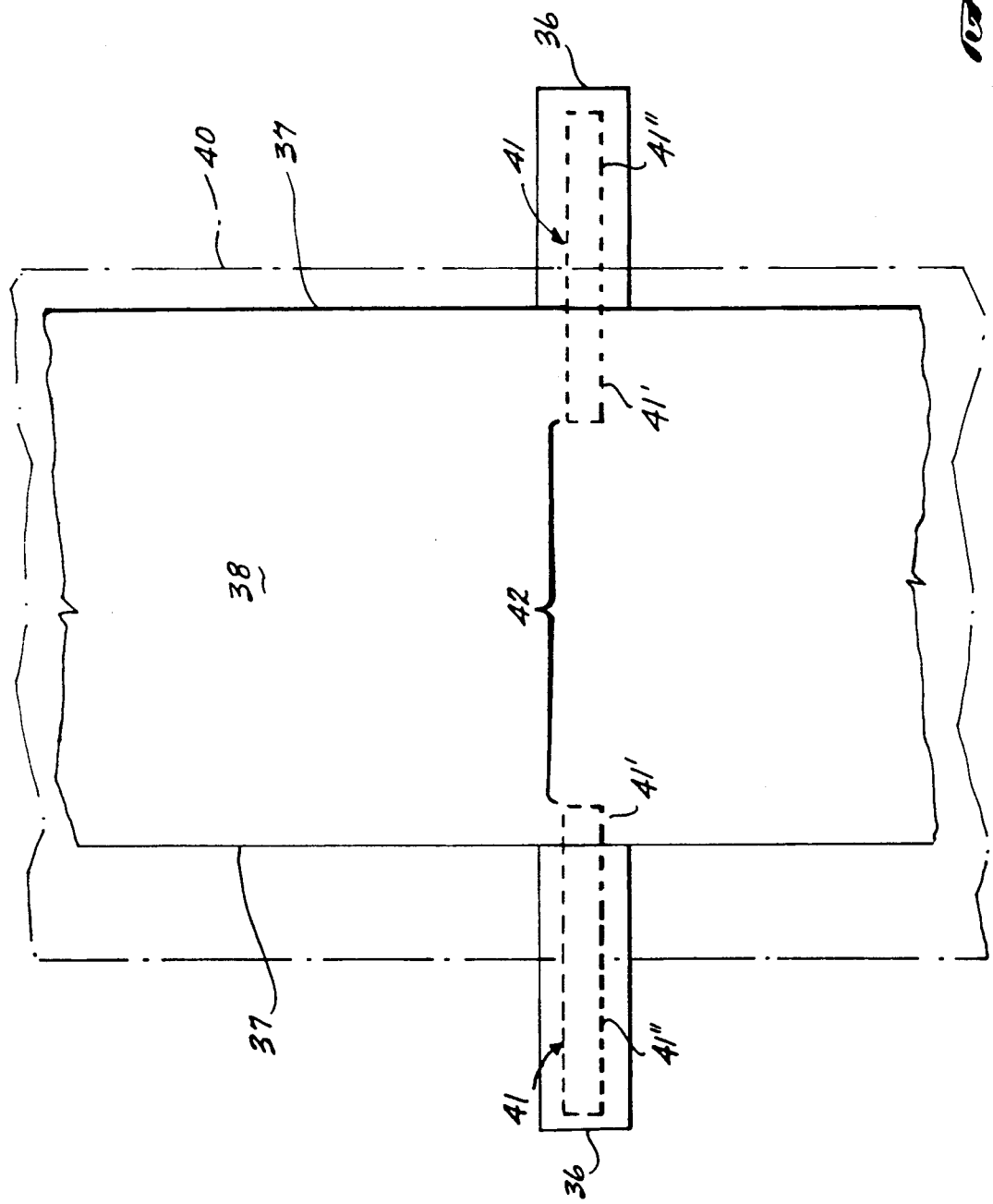
FIG. 4 is a top view of a strip illuminated by a sensor component including a pair of edge detectors of the type shown in FIG. 3.

FIG. 4 shows a tape strip 38 with both edges 37 as they would be illuminated by a pair of edge detectors 20 (not shown). A properly aligned and dimensioned strip 40 is shown in reference. In comparison to the reference strip 40, the tape strip 38 is uncentered and is narrower than it should be. The areas illuminated by the illuminating devices 22 and viewed by the imaging devices 26 appear as two rectangular areas 41. The rectangular areas 41 are dimensioned so as to cover the area of possible misalignment of the tape edges. For example, if the system is meant to measure a three-inch wide tape, rectangular areas 41 of approximately one-half inch in length are provided. This length will generally be large enough to accommodate the tape edge misalignment.

The edge detectors 20 are arranged in the sensor component 12 with a separation 42 that is also related to the dimension of the tape that will be monitored by the system. For example, if a three-inch wide tape is to be monitored, the edge detectors will be aligned in the sensor component with a three-inch separation between their center points. The edge detector center points are the points corresponding to the centers of the LED and CCD arrays in the edge detectors. In this manner, when monitoring is performed, the rectangular areas 41 are centered over points at which properly dimensioned tape edges would terminate (e.g., the edges of tape 40). In this example, the separation 42 between the edge detectors is approximately two and one-half inches.

During the monitoring process, the rectangular areas 41 are illuminated by the illuminating devices. The light reflected from the rectangular areas 41 is focused into the imaging devices. Because the tape is dull and nonreflective, the tape portions 41' do not reflect a significant amount of light into the edge detectors. The surface portions 41", not covered by the tape, reflect a significant amount of light into the edge detectors because the surfaces are bright and reflective. If a CCD in the imaging device receives light, it is charged; if a CCD does not receive light, it remains uncharged. Thus, the charged/uncharged arrays of CCDs in each edge detector mirror the reflective/nonreflective portions of a rectangular area 41 under the edge detector.

Returning to FIG. 2, the controller 14 is an electronic system, preferably located in close proximity to the sensor component 12, such as in the same physical unit. The central processor 28 of the controller includes a microcontroller 46, a pair of Schmitt triggers 48, a pair of retriggerable monostable multivibrators 50, a pair of down counters 52, a clock 54 and a synchronous circuit 56. Preferably, the interface 32 is formed by an asynchronous communications interface adaptor. In any event, the interface 32 is connected to the microcontroller 46 via control buses 58 and a data bus 59.

The outputs of the video amplifiers 34 are each connected to the input of one of the Schmitt triggers 48. The outputs of the Schmitt triggers are each connected to the input of one of the monostable multivibrators 50. The outputs of the monostable multivibrators are each connected to the enable inputs of one of the down counters 52. The clock 54 provides clock pulses to the CCDs 26, the down counters 52, the microcontroller 46 and the asynchronous communications interface adaptor 32. The clock pulses are also applied to the synchronous circuit 56, which also receives a start command from the microcontroller 46. The synchronous circuit 56 provides output to the clock and to the sensor component. The microcontroller also applies a preload command to the down counters 52. The preload and start commands occur sequentially. The preload command causes the microcontroller to preload a fixed count value in each down counter register. The preload value is related to the width of the illuminated rectangular area. The power supply 60 supplies power to the sensor component 12 and the controller 14.

In order to convert the sensor component output into useful data, the CCDs are scanned. The clock pulses produced by the clock 54 control the scanning of the CCDs. The beginning of a scanning cycle is initiated by the microcontroller via the synchronous circuit 56. More specifically, scanning is started when the synchronous circuit receives a clock pulse after receiving a start command from the microcontroller. Each subsequent clock pulse causes the output of the next CCD in each of the linear CCD arrays to be applied to the output of its associated video amplifier 34. The outputs of the video amplifiers are input to the Schmitt triggers 48. The Schmitt triggers provide a fast rise signal to a fixed threshold level each time the output of the video amplifier 34 rises above a predetermined level. A fast rise is required to trigger (or retrigger) the monostable multivibrators 50. The time constant of the monostable multivibrators is such that a binary one (1) is produced for a period slightly longer than a clock cycle. As a result, as long as the outputs of the sequentially scanned CCDs are high enough to trigger the associated Schmitt trigger 48, the associated output of the monostable multivibrator 50 remain high. Just over one clock pulse after a CCD output drops low, the output of the monostable multivibrator drops low. Thus, as long as the scanned CCDs receive bright light (from a contrasting surface 36) their associated multivibrators are triggered (or retriggered) and produce a binary one (1) output. The output enables the associated down counter for one clock-pulse; the down counter subtracts one from the preload total.

When the CCD corresponding to an edge 37 of the tape is reached, the CCD output drops low because the tape is dark when compared to the contrasting surface 36. When this occurs, the output of the associated monostable multivibrator drops low, disabling the associated down counter 52. As a result, during a scanning cycle, the down counters are enabled to decrement the preload total once for each clock pulse for a period of time related to the number of CCDs that receive light from the contrasting surface 36. Once a CCD above the tape is reached, the down counter is disabled. After the scanning cycle, the down counters' registers each hold a value proportional to the width of the associated illuminated tape edge 41'. As will be better understood from the following description, each time a scanning cycle is completed, the down counters' count values are read. The count values are used to calculate the tape width and centerline skew.

In summary, the microcontroller applies a preload signal to the down counters 52, which preloads the down counters' registers with a fixed count value preferably equal to the number of CCDs in each array, 512 for example. After the preload, the start command for initiating the CCD scanning cycle is generated by the microcontroller 46. The start command is synchronized by the synchronous circuit 56. Thereafter, the CCDs are scanned and produce output signals, the signals are amplified by the video amplifiers 34, and are used to trigger (or retrigger) the Schmitt triggers 48. The Schmitt triggers, in turn, cause the monostable multivibrators 50 to produce signals that enable the down counters to count down at the clock frequency rate. When the monostable multivibrator outputs change state, the down counting terminates. At the end of a scanning cycle, the count values in the down counters' registers are read. As described more fully below, the microcontroller uses the count values to determine tape width and centerline skew values. These values are compared to tolerance values to determine if a tape error signal should be produced. The cycle is then repeated.

During the monitoring process, segment position data is also generated and stored with the tape characteristic data for use by the program in interpolating gaps and overlaps between adjacent strips. The segment position data identifies longitudinal segments of a strip. In one embodiment, the segment position data is generated by an incremental encoder (not shown) incorporated in the tape lay-up machine. The encoder generates a segment position signal each time a predetermined length of tape is laid. The incremental encoder is attached to a shaft of a known circumference and the tape is positioned in contact with the shaft; the tape passing by the shaft causes the encoder shaft to rotate. In one particular embodiment, the circumference of the shaft is six (6) inches. A position signal is generated by the encoder for every six inches of the tape strip that is laid. The segment position signal is transmitted from the microcontroller using the asynchronous communications interface adapter. The microcontroller stores the signal with the tape characteristic data. Segment position data thus appears periodically in the tape characteristic data.

The segment position data can be used to calibrate tape position on the receiving surface. For example, in a tape lay-up procedure wherein each tape strip is laid perpendicularly to one edge of a composite part, referred to as the leading edge, the segment position encoder begins measuring tape segments at the leading edge. The segment position data may be integer data identifying a segment number. Gap and overlap between adjacent tape strips can be analyzed at each data point identified with segment position data. Alternatively, if a number x of data entries are generated for each six inches of tape, then gap and overlap can be analyzed for each six/x-inch tape segment by selecting x data entries accordingly. Certainly, data for a variety of strip lengths can be analyzed by selecting spaced data entries. The points along adjacent tape strips that are identified by the same segment position data are termed common points.

Figure 5:
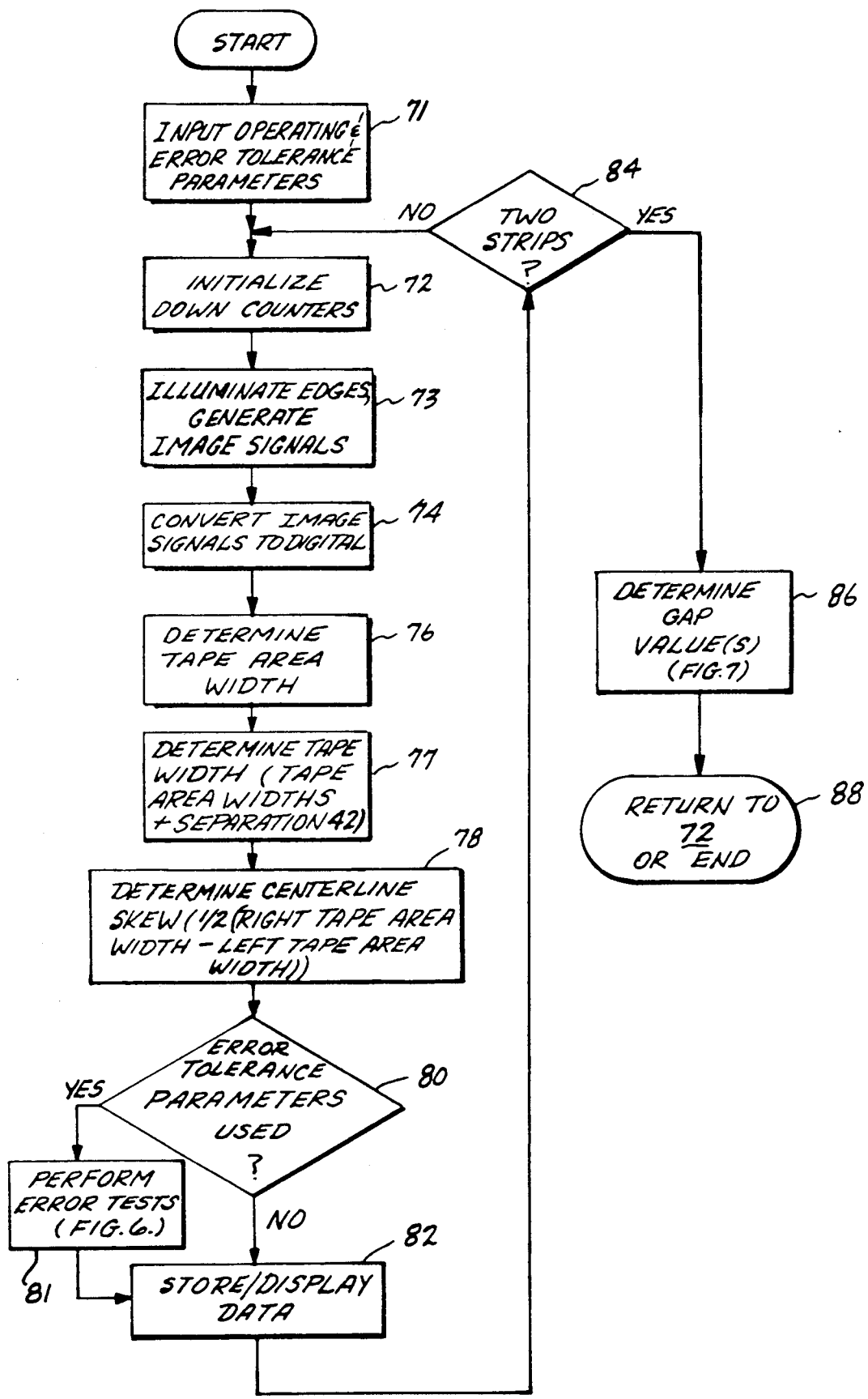
FIGS. 5 and 6 are flow diagrams of a method of gathering and analyzing strip characteristic data in accordance with the present invention.

As noted above, the controller 14 is controlled by a program executed by the microcontroller 46. The program causes the strip lay-up verification system to receive input from the operator (optional), monitor the lay-up of a tape strip, generate width and centerline skew data, and generate gap/overlap data for adjacent tape strips. With reference to FIG. 5, the data gathering process at blocks 71-74 is performed by the operator interface and the sensor component under the control of the program. Once a set of monitored data for a point on the tape is gathered, the program analyzes the data at blocks 76-82 and generates width and centerline skew data. After data has been gathered for two adjacent strips, the gap/overlap analysis is performed by the program at block 86. Using this procedure, monitoring using readily modifiable standards is performed. The operator receives immediate information that can be used to modify the strip lay-up procedure if necessary.

At block 71, operating parameters and error tolerance parameters are input by the operator before monitoring begins. Operating parameters include a tape width operating parameter and the separation distance between the edge detectors. The tape width operating parameter is the expected width of the tape that will be laid, for example, three inches. The separation distance is the distance between the illuminated areas 41, for example two and one-half inches. Error tolerance parameters include tape width tolerance, centerline tolerance, centerline correction and error delay. Alternatively, any of the parameter values can be present, e.g., hard coded, in the main control program.

By using error tolerance parameters, the system is able to provide the operator with immediate error alarms when the tape lay-up process is out of tolerance. The values for the error tolerance parameters are based on the desired quality of the resultant composite part. As discussed below, if any of the error tolerance parameter values are exceeded during tape lay-up operations, an alarm is generated for the operator and/or an error indication is set in the result data. The alarm may be an audio or visual alarm presented via the operator interface 16.

In one actual embodiment, if the centerline skew and/or tape width are determined to be out of tolerance, an error indication related to the particular characteristic is generated. The error indication is then stored and/or displayed along with the centerline skew and tape width values for the monitoring cycle. The error indication may be a flag (e.g., binary 0 or 1) related to the particular characteristic, or it may be a complete message that describes the error in detail. The error delay parameter is a predetermined number of errors of either a single type or several types that must occur before an error alarm is generated. The error delay parameter provides a certain level of noise immunity for conditions where operations near the tolerance settings do not constitute a problem in part quality. This parameter should be set to the largest number that will provide acceptable tape lay-up quality. If an error delay parameter is input, an error counter (e.g., a register in the microcontroller) is set to zero at start-up. If the total number of centerline skew and/or tape width errors exceeds the error delay parameter during operation, an error alarm is generated. In this manner, the tape data that is continuously generated includes error indications that can later be identified and analyzed, while excessive errors are brought to the operator's attention via the error delay alarm.

As the parameter values are input, they are stored in the memory 30. The tape width tolerance parameter defines the maximum allowable variation in tape width. The centerline tolerance parameter defines the maximum allowable deviation in centerline skew.

The centerline correction parameter is used in the centerline skew analysis. The centerline correction parameter takes into account any known minor discrepancies in the centering of the tape under the edge detectors. Thus, minor hardware misalignments are compensated for by software corrections. As described above, the edge detectors are positioned so that they are centered over the expected tape edge position. The centerline correction parameter corresponds to changes in the expected tape position based on the tape lay-up machine operation. In one actual embodiment of the invention, each unit of centerline correction represented ±1/1000 inch, the positive or negative sign denoting the direction. e.g., left and right, respectively, of the correction. For example, if the tape lay-up machine is laying the tape edge 2/1000 inch off-center to the left from the centerlines over which the edge detectors are positioned, the apparent centerline of the monitored area is software adjusted +2/1000 inch during the centerline skew analysis.

After the operating and error tolerance parameters are input and the values stored, a monitoring cycle begins. As noted above, and more fully described below, at the start of each monitoring cycle, the down counters 52 are initialized by preloading their registers with a maximum value. Then the sensor component 12 is energized to illuminate the tape edges and a pair of edge image signals are generated. The edge image signals are analyzed to produce tape width and centerline skew values. As discussed above, the timing of the monitoring cycle is controlled by the clock 54 and synchronized by the synchronous circuit 56. The length of the monitoring cycle depends, in part, upon the time required by the sensor component to generate the edge image signals, and the time required by the controller to analyze the signals. Generally, the cycle time is limited by the hardware speed. In one actual embodiment, the entire monitoring cycle is performed in approximately 5 milliseconds.

With reference again to FIG. 5, at block 72 the down counters 52 are preloaded from the microcontroller 46 with the maximum count. Preferably, each counter is loaded with a number that equals the total number of CCDs in a CCD array. At block 73, the sensor component is enabled to illuminate the tape edges and generate a set of edge image signals. The enabling signal is generated by the synchronous circuit under the control of the microcontroller.

At block 74, the controller 14 receives the amplified edge image signals from the sensor component 12 and performs an analog-to-digital conversion of the signals via the Schmitt triggers 48, and the monostable multivibrators 50. The digital signals are transmitted to the enable input of down counters 52 in the manner described above.

At block 76, the CCD scanning is completed. The dimensions of the tape areas 41' are then determined using the decremented down counter count values. The count values are read from the down counters' registers. The count values correspond to the number of CCDs that were not illuminated by light reflected from the tape areas 41'. The dimension of each tape area 41' is determined via a known pixel/distance ratio, where each pixel equals one count. As an example, if 512 pixels or counts equal one-half inch, the pixel/distance ratio is 512/0.5. For this particular ratio, the accuracy of the measurement is to 1/1000 inch. The microcontroller reads the down counters' register contents and converts the counts (pixels) into tape area width 64' values. At block 77, the entire tape width is calculated by the microcontroller as the sum total of the separation distance 42 and the two tape area 41' width values.

At block 78, the microcontroller calculates the centerline skew. The actual centerline of the tape is the position halfway between the tape edges. The centerline skew represents the deviation of the actual centerline position from the expected centerline position. The centerline skew can be determined by comparing the relative positions of the tape edges detected by the edge detectors. This is because the edge detectors are symmetrically positioned about the expected centerline. The difference between the two tape area 41' widths, calculated at block 76, is the relative misalignment between the tape edges about the sensor component's centerline, which is the same as the expected tape centerline. One-half of the tape widths differenc represents the offset of the centerline from the expected centerline position. The sign of the difference defines the direction of skew, e.g., in one embodiment a positive difference indicates a skew to the right and a negative difference indicates a skew to the left.

At block 80, a check is made to determine if error tolerance parameters are used. If error tolerance parameters are used, centerline skew modifications and error tolerance tests are performed at block 81, preferably in the manner illustrated in FIG. 6.

Figure 6:
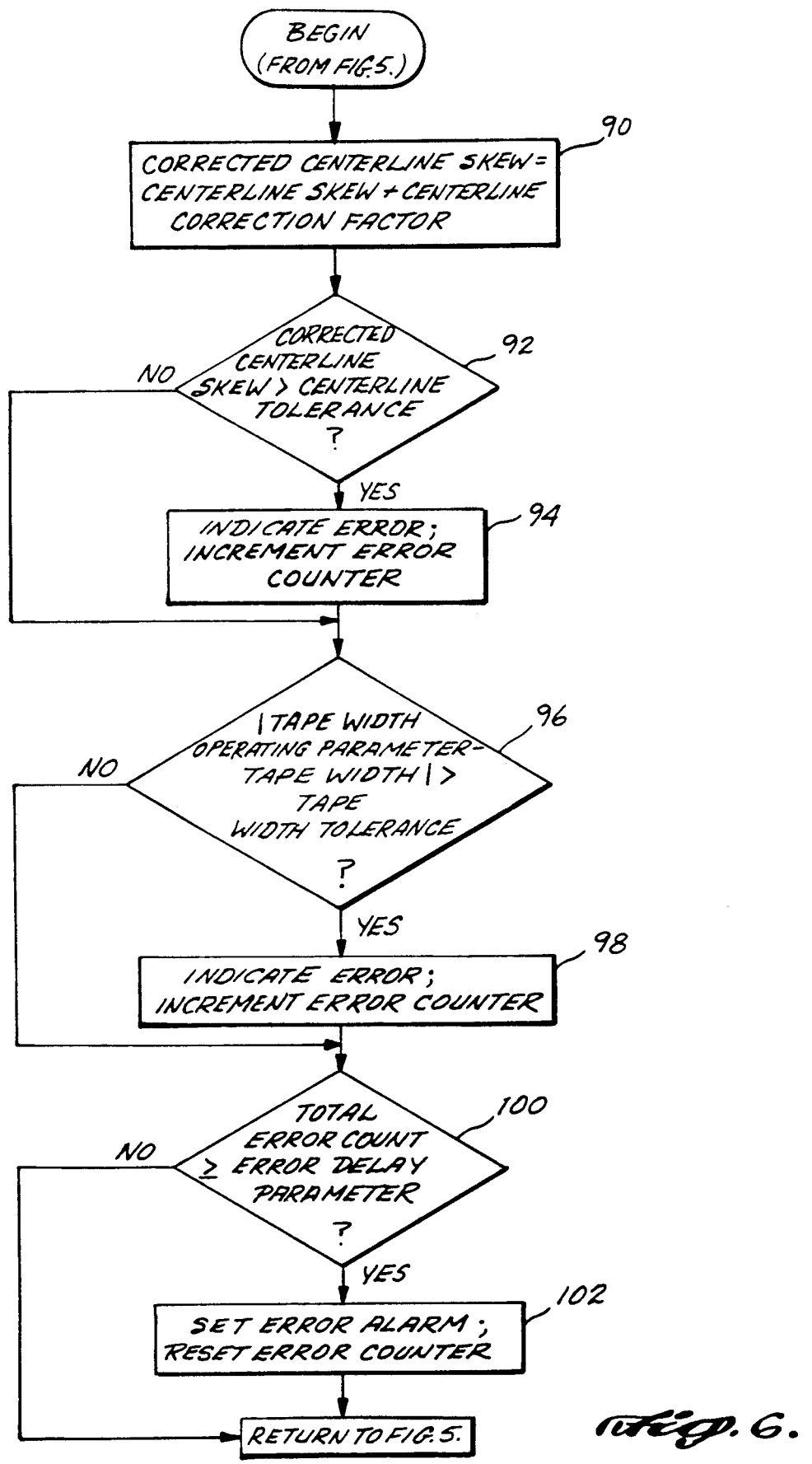

With reference to FIG. 6, at block 90, the centerline correction parameter is added to the centerline skew to correct the centerline skew. At block 92, the absolute value of the (corrected) centerline skew is compared to the centerline tolerance parameter. The comparison determines whether the magnitude of the centerline skew is greater than what is considered to be an acceptable skew. If the centerline skew is greater than the centerline tolerance parameter, at block 94 a centerline skew error indication is generated and the error counter is incremented. Next, the system determines whether the actual tape width is acceptable relative to the expected tape width (represented by the tape width operating parameter) and the tape width tolerance parameter. To test tape width acceptance, at block 96, the actual tape width is subtracted from the tape width operating parameter. If the absolute value of the difference between the actual tape width and the tape width operating parameter is greater than the tape width tolerance parameter, a tape width error indication is generated and the error counter is incremented at block 98.

At block 100, the total error count in the error counter is compared to the error delay parameter. If the error count total equals or exceeds the error delay parameter, an error alarm is generated and the error counter is reset to zero at block 102.

With reference again to FIG. 5, at block 82, the tape width and centerline skew values, and error indications are stored and/or displayed. If an error alarm was generated, it is immediately presented to the operator.

Using the apparatus of the present invention, accurate centerline skew and tape width information is available to an operator as the tape lay-up process is performed. Additionally, tolerance tests are performed as the data is gathered and the results thereof are provided to the operator in the form of error indications and alarms. Additionally, the system generates a comprehensive tape characteristic database that can be analyzed to determine tape quality and tape lay-up operation quality.

At block 84, a check is made to determine whether two adjacent strips have been laid. If two adjacent strips have not been laid, the monitoring cycle is repeated beginning at block 72. After two adjacent strips are laid, hereinafter referred to as prior and current strips, for each common point shared by the strips or for a selected set of common points, a gap/overlap value is determined at block 86, preferably in the manner illustrated in FIG. 7. At block 88, after the gap/overlap data is generated, the process returns to block 72 to continue to monitor the tape lay-up process. Alternatively, the monitoring process may be terminated in response to operator input or after a predetermined number of strips have been laid.

Figure 7:
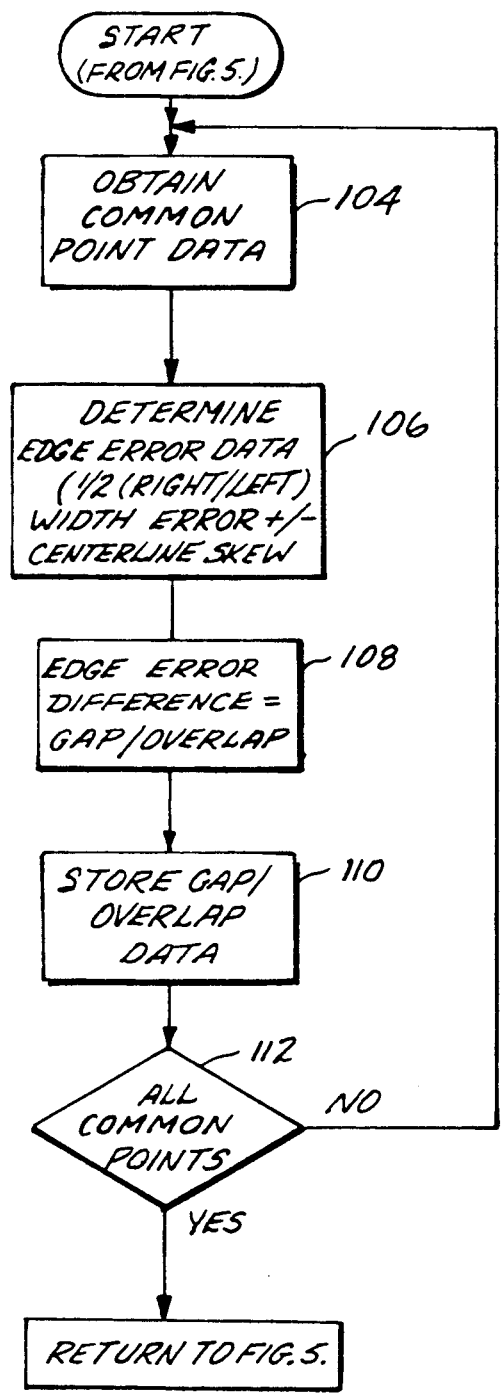
FIG. 7 is a flow diagram of a method for calculating gap and overlap in accordance with the present invention.

With reference to FIG. 7, at block 104, a set of prior strip and current strip data for the same common point are obtained from memory. The common point data is identified using the segment position data. An example of such data is:

| TAPE | SEGMENT POSITION | WIDTH ERROR | CENTERLINE SKEW |
|---|---|---|---|
| Prior | 1 | −0.003 | +0.001 |
| Current | 1 | 0.000 | +0.002 |

In one embodiment, the current strip is laid to the right of the prior strip. At block 106, the amount of the prior strip right edge is out of position and the amount the current strip left edge is out of position are determined. This position information is referred to as edge error data—the relative displacement of an edge from its expected position. The prior tape right edge error is determined by adding one-half the prior tape width error to its centerline skew:

$$(0.001 + -0.0015) = -0.0005$$

The current tape left edge error is determined by subtracting one-half the current tape width error from its centerline skew:

$$(0.002 - 0.000) = +0.002$$

The sign of an edge error represents the relative direction of the error.

At block 108, the gap/overlap at the common point is determined. The prior tape right edge error is subtracted from the current tape left edge error:

$$(0.002 - (-0.0005)) = -0.0025$$

The result is zero (0) for a flush match; positive for a gap; and negative for an overlap (negative gap). In the present case, the result of +0.0025 indicates a gap with magnitude 0.0025 inches. At block 110, the gap/overlap data for the common point is stored and/or displayed in conjunction with the segment position data. At block 112, a check is made to determine whether the data has been analyzed for each common point shared by the prior and current tapes. The process returns to block 104 if there is additional data to be analyzed. Otherwise, the process is completed.

As an alternative method for determining the gap/overlap between the prior strip and the current strip after the current strip has been completely laid, the gap/overlap can be analyzed as the centerline skew and width data are being generated for the current strip. The operator can then stop the lay-up of the current strip immediately if the gap/overlap data indicates a significant quality problem. In this method, the check at block 84 of FIG. 5 is modified so that the steps related to block 86 are carried out after each monitoring cycle, or after a predetermined number of cycles have passed or lengths of strip are laid. If such a process is implemented, the step described in conjunction with block 112 can be skipped.

While preferred embodiments of the invention have been illustrated and described, it will be appreciated that various changes can be made herein without departing from the spirit and scope of the invention. In one actual embodiment, the monitored information is transformed and stored rather than storing the raw data. The data transform used is the arithmetic mean and the standard deviation for a set of samples. A sampling of centerline skew data and a sampling of tape width data are transformed into these forms to provide an overall view of the lay-up quality.

The gap/overlap analysis can also be performed if only the centerline skew or the width data is generated. If only the tape width is monitored, the gap/overlap analysis assumes that the tape centerline is correct and, for each tape, assigns half of the width error to each edge of the tape. If only the centerline skew is monitored, the gap analysis assumes that the tape width is correct and simply compares the prior strip centerline skew to the current strip centerline skew during the gap/overlap analysis. The type of monitoring process that is chosen will depend upon the tape quality, e.g., width consistency, and the tape lay-up processes quality, e.g., centerline placement consistency. However, most processes will benefit from a system wherein both tape width and centerline skew are monitored.

As an additional example of modifications to the above-described embodiment, the centerline skew analysis process can be altered so that the centerline is located by selecting the position that is halfway between the two tape edges and comparing that position to the expected centerline position.

Additionally, the clock can be utilized to send data periodically to the operator interface. For example, if 200 monitoring cycles are performed per second, it is unnecessary to display each resulting data set for operator review. The clock can be used to set a data transmit flag every one-half second, for example. When the flag is set, data is sent to the operator interface. In between flags, data is not sent. In this embodiment, all gathered data is still stored since it is valuable for later analysis.

Extended applications for the centerline verification system include integration into automated control systems. An automated control system would analyze the centerline skew and width data and, if necessary, alter in real-time, the path established by the numerical program controlling tape lay-up in order to reduce the gap between tape runs. Another application is integrating the data collected by the sensor system with other more subjective data such as how well the tape sticks to the ply, how quickly it loses volatile solvents, etc., in order to qualify new tape formulations. The complete data set can then be used to analyze various aspects of the quality of the component part.

The tape position determination may be integrated with the NC program. The position controls that guide the tape lay-up machine utilize x-y-z coordinate and warp data. By connecting the controller 14 to the tape lay-up machine controller, the coordinate data can be obtained by the controller. This data can then be analyzed to determine the common points between adjacent tape strips.

Finally, if desired, the sensor component can be constructed so that the edge detectors are a fixed or an adjustable distance apart. If the edge detector separation is adjustable, the separation 42 between the detectors must be entered into the main control program before the monitoring process begins because the program uses this distance information to calculate the total width of the tape. The tape width and centerline calculations themselves do not have to be altered. Alternatively, the sensor component can include a single edge detector constructed such that illuminating, focusing, and imaging by the edge detector extends across the entire width of the tape and includes each edge.

The embodiments of the invention in which an exclusive property or privilege is claimed are defined as follows:

1. A strip lay-up verification system for determining characteristics such as strip width and strip centerline skew of a strip laid on a receiving surface, the strip having a particular reflective characteristic, the system comprising:
   (a) a contrasting surface having a reflective characteristic that contrasts the reflective characteristic of the strip;
   (b) means for guiding the strip over said contrasting surface as the strip is laid;
   (c) a sensor component for generating an edge image signal, said sensor component positioned such that the strip passes between said sensor component and said contrasting surface as it is laid, and including:
      (i) illuminating means for illuminating an area including each edge of said strip as it is guided over said contrasting surface; and
      (ii) imaging means for detecting the light reflected by said illuminated area and generating edge image signals from said detected light; and
   (d) a controller in signal communication with said sensor component including:
      (i) data gathering means for causing said sensor component to illuminate said area and generate said edge image signals; and
      (ii) analysis means for receiving said edge image signals and determining width and centerline skew characteristics of the strip therefrom.

2. A strip lay-up verification system as claimed in claim 1, wherein said verification system is included in a system for laying a pair of strips side-by-side on the receiving surface, and wherein said analysis means receives edge image signals related to said pair of strips and determines the gap or overlap between said strips.

3. A strip lay-up verification system as claimed in claim 1, wherein said illuminating means includes a pair of light-emitting diode arrays, and said imaging means includes a gradient refractive index lens array and a charge coupled device array.

4. A strip lay-up verification system as claimed in claim 1, wherein said sensor component includes a pair of edge detectors, each edge detector including illuminating means and related imaging means such that each of said illuminating means illuminates an area including one edge of the strip.

5. A sensor component for generating an edge image signal in a strip lay-up system, the strip having a particular reflective characteristic, wherein the strip is laid by the lay-up system which includes a contrasting surface having a reflective characteristic that contrasts the reflective characteristic of the strip and a guide mechanism for guiding the strip over the contrasting surface as the strip is laid, the sensor component including:
   (a) illuminating means for illuminating an area including each edge of the strip as it is guided over the contrasting surface;
   (b) imaging means for detecting the light reflected by said illuminated area and generating edge image signals from said detected light; and
   (c) segmenting means for generating strip segment position information as the strip is guided over the contrasting surface;
whereby said sensor component can be positioned such that the strip passes between said sensor component and the contrasting surface as it is laid, and said edge image signals and strip segment position information are used by the lay-up system to determine characteristics such as strip width and strip centerline skew.

6. A strip lay-up verification system as claimed in claim 5, wherein said illuminating means includes a pair of light-emitting diode arrays, and said imaging means includes a gradient refractive index lens array and a charge coupled device array.

7. A strip lay-up verification system as claimed in claim 5, wherein said sensor component includes a pair of edge detectors, each edge detector including illuminating means and related imaging means such that each of said illuminating means illuminates an area including one edge of the strip.

8. A method of determining gaps and overlaps between a pair of strips laid side-by-side on a receiving surface comprising the steps of:
   (a) illuminating an area including each edge of said strips as said strips are being laid at a common point on the receiving surface;
   (b) detecting the light reflected by said illuminated area as said strips are being laid;
   (c) generating edge image signals for each of said strips based on the light reflected by said illuminated area;
   (d) determining a centerline skew value for each of said strips based on said edge image signals; and
   (e) comparing said centerline skew values at said common point and generating signals indicative of the gap or overlap between said strips.

9. The method claimed in claim 8, further including the step of: determining a width value for each of said strips from said edge image signals.

10. The method claimed in claim 9, further including the step of adjusting said centerline skew values for each of said strips in accordance with said width value for said strip before said step of comparing said centerline skew values, such that said adjusted centerline skew values are compared.

11. The method as claimed in claim 9, wherein said centerline skew values are continuously determined as said strips are laid on the surface.

12. The method as claimed in claim 8, wherein said centerline skew values are determined at a plurality of common points, said centerline skew values are compared at said plurality of common points, and a plurality of signals indicative of the gap or overlap between said pair of strips at said common points are generated.

13. The method as claimed in claim 8, wherein said step of illuminating said area includes illuminating two subareas, each of said subareas including one edge of each of said strips.

14. The method as claimed in claim 8, wherein said pair of strips are laid in a unidirectional manner, further including the step of adjusting said centerline skew values prior to comparing said centerline skew values, by adding a pair of predetermined centerline correction parameters to each of said centerline skew values to produce adjusted centerline skew values, whereby said predetermined centerline correction value corresponds to a known misalignment of said pair of strips.

15. A method of determining gaps and overlaps between a pair of strips laid side-by-side on a receiving surface comprising the steps of:
(a) illuminating an area including each edge of said strips as said strips are being laid;
(b) detecting the light reflected by said illuminated areas as said strips are being laid at a common point on the receiving surface;
(c) generating edge image signals for each of said strips based on the light reflected by said illuminated area;
(d) determining a width value for each of said strips based on said edge image signals; and
(e) comparing said width values of said strips at said common point and generating signals indicative of the gap or overlap between said strips.

16. The method as claimed in claim 15, wherein said width values are determined at a plurality of common points, said width values are compared at said plurality of common points, and a plurality of signals indicative of the gap or overlap between said pair of strips at said common points are generated.

17. The method as claimed in claim 15, wherein said step of illuminating an area includes illuminating two subareas, each of said subareas including one edge of each of said strips.

18. A strip lay-up verification system for determining characteristics such as strip width and strip centerline skew of pairs of strips laid side-by-side on a receiving surface, the strip having a particular reflective characteristics, the system comprising:
(a) a contrasting surface having a reflective characteristic that contrasts the reflective characteristic of the strip;
(b) means for guiding the strip over said contrasting surface as the strip is laid;
(c) a sensor component for generating an edge image signal, said sensor component positioned such that the strip passes between said sensor component and said contrasting surface as it is laid, and including:
  (i) illuminating means for illuminating an area including each edge of said strip as it is guided over said contrasting surface; and
  (ii) imaging means for detecting the light reflected by said illuminated area and generating edge image signals from said detected light; and
(d) a controller in signal communication with said sensor component including:
  (i) data gathering means for causing said sensor component to illuminate said area and generate said edge image signals; and
  (ii) analysis means for receiving said edge image signals and determining the gap or overlap between pairs of strips.

19. A strip lay-up verification system for determining characteristics such as strip width and strip centerline skew of a strip laid on a receiving surface, the strip having a particular reflective characteristic, the system comprising:
(a) a contrasting surface having a reflective characteristic that contrasts the reflective characteristic of the strip;
(b) means for guiding the strip over said contrasting surface as the strip is laid;
(c) a sensor component for generating an edge image signal, said sensor component positioned such that the strip passes between said sensor component and said contrasting surface as it is laid, and including:
  (i) illuminating means for illuminating an area including each edge of said strip as it is guided over said contrasting surface;
  (ii) imaging means for detecting the light reflected by said illuminated area and generating edge image signals from said detected light; and
  (iii) segmenting means for generating strip segment position information as said strip is guided over said contrasting surface; and
(d) a controller in signal communication with said sensor component including:
  (i) data gathering means for causing said sensor component to illuminate said area and generate said edge image signals, and for causing said segmenting means to generate strip segment position information; and
  (ii) analysis means for receiving said edge image signals and said strip segment position information and determining characteristics of the strip therefrom.

20. A strip lay-up verification system as claimed in claim 19, wherein said verification system is included in a system for laying a pair of strips side-by-side on the receiving surface, and wherein said analysis means determines the gap or overlap between said strips from said edge image signals and said strip segment position information.

21. A strip lay-up verification system as claimed in claim 19, wherein said strip characteristics are strip width and centerline skew.

* * * * *

UNITED STATES PATENT AND TRADEMARK OFFICE
CERTIFICATE OF CORRECTION

PATENT NO. : 5,120,976
DATED : June 9, 1992
INVENTOR(S) : D.A. Clayton et al.

It is certified that error appears in the above-identified patent and that said Letters Patent is hereby corrected as shown below:

| COLUMN | LINE | |
|---|---|---|
| 10 | 12 | "present" should read --preset-- |
| 12 | 5 | "differenc" should read --difference-- |
| 17 | 32 & 33 | "charac-teristics" should read --characteristic-- |

Signed and Sealed this

Tenth Day of August, 1993

Attest:

MICHAEL K. KIRK

*Attesting Officer*    Acting Commissioner of Patents and Trademarks